UNITED STATES PATENT OFFICE.

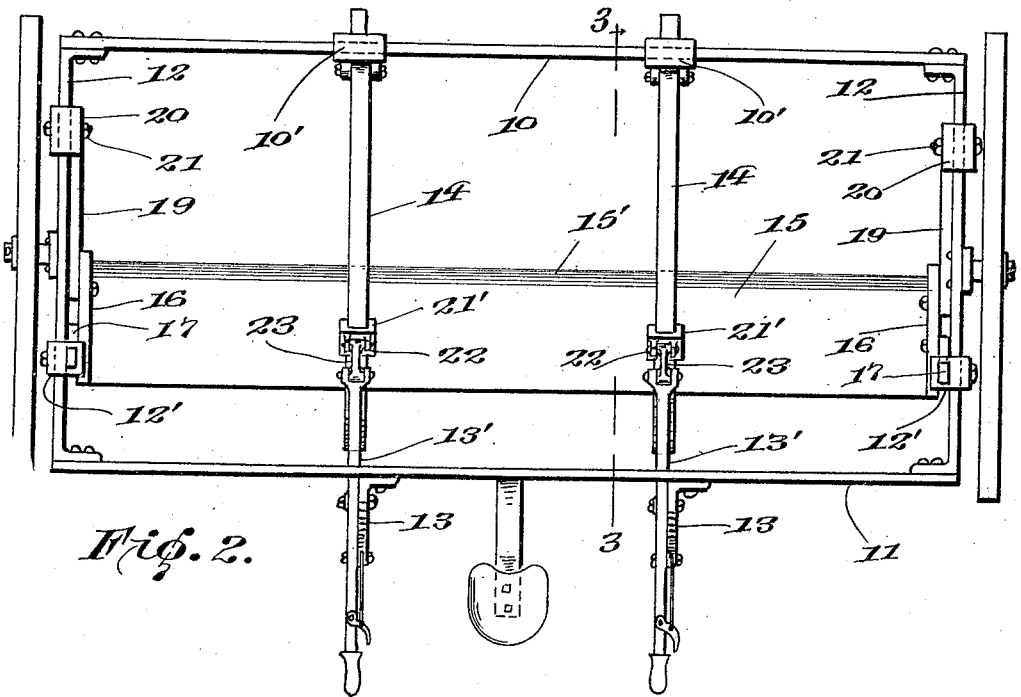

JAMES E. STEPHENS, OF LIBBY, MONTANA.

WEED DESTROYER.

1,405,030.   Specification of Letters Patent.   Patented Jan. 31, 1922.

Application filed February 28, 1921. Serial No. 448,627.

*To all whom it may concern:*

Be it known that I, JAMES E. STEPHENS, a citizen of the United States, residing at Libby, in the county of Lincoln, State of Montana, have invented certain new and useful Improvements in Weed Destroyers; and I do hereby declare the following to be a full, clear, and exact description of the invention, such as will enable others skilled in the art to which it appertains to make and use the same.

This invention relates to new and useful improvements in weed destroyers, and particularly to weed diggers.

In the operation of weeding, with machines now in use, the diggers lift the weeds from the ground, and then the diggers behind the first ones throw the soil over the weeds, thus replanting them. This is very objectionable, and the work of digging the weeds is wasted.

The present invention contemplates a digger by means of which the weeds will be lifted from the ground and the soil permitted to fall first, thus leaving the weeds on the top of the soil to be dried and withered, and finally killed by the heat of the sun.

The present invention also contemplates a machine which is readily adjustable to dig to different depths according to the character of the weeds, some weeds being stronger and growing with their roots to greater depths in the ground than others.

Other objects and advantages will be apparent from the following description when taken in connection with the accompanying drawings.

In the drawings:

Figure 1 is a side elevation of a weed digging machine made in accordance with the invention.

Figure 2 is a top plan view of the same.

Figure 3 is a vertical sectional view across the minor dimension on the line 3—3 of Fig. 2.

Referring particularly to the accompanying drawings there is shown a drill frame in which is included the longer parallel front and rear bars 10 and 11, and the connecting and spacing end bars 12. On the rear face of the rear bar 11 are detachably clamped the rearwardly extending rack segments 13 on each of which is pivotally supported the intermediate portion of an upwardly and forwardly curved lever 13'. Detachably mounted on the front member 10, of the frame, are the brackets 10', and pivotally connected with each bracket, is a rearwardly and downwardly extending beam 14. Secured to the lower curved ends of the beams 14 is a blade 15, the same having its opposite ends turned upwardly, as at 16. Detachably secured to the end bars 12, are the brackets 12' in which are vertically slidable the upper ends of the downwardly and rearwardly inclining curved links 17, the lower ends of said links being pivotally connected to the upturned ends 16 of the blade. Also pivotally connected to the ends 16, by means of the pivots 17', are the upwardly and forwardly inclined braces 19, the upper ends of said braces being pivotally connected to the brackets 20 which are carried by the end bars 12 of the frame. A set screw 21 is disposed through each bracket 20 to permit adjustment of the braces 19 so as to tilt the blade 15 into different angles with respect to the ground, for the purpose of digging to greater or lesser depths. It will be noted that the upper ends of the braces 19 are pivotally connected to the brackets 20 so that when the curved links 17 are moved through the brackets 12', said braces will swing on their pivots to permit the blade to assume different angles with respect to the ground. The forward edge of the blade 15 is preferably sharpened, as shown at 15' for the purpose of properly entering the ground, as the machine is drawn.

Carried by each beam 14 is a collar 21' having an upwardly extending lug 22 to which is pivotally connected a link 23, said link being also pivotally connected to the adjacent end of the lever 13', whereby when said lever is rocked on its pivot the beam will be moved upwardly or downwardly to elevate or lower the blade 15. Thus the angle of the cutting edge of the blade can be quickly and easily changed to suit the conditions of the soil and the weeds.

As the machine is drawn the blade will dig into the ground, lift a quantity of the soil, together with the weeds, the soil sifting back over the rear edge of the blade and falling onto the ground, while the weeds will be left on the top of such sifted soil, and thus be exposed to the sun with the view to their early and complete withering and destruction. Devices of this character heretofore dig up the soil and weeds, but upon dumping them onto the ground, a second set of diggers immediately covers the weeds, with the result that the weeds are practically replanted and quickly spring up again, thus rendering the operation of digging useless. With the present device the weeds are left on top of the soil to be destroyed by the sun, this rendering the extermination of the weeds effective and complete.

What is claimed is:

1. A weed destroyer including a frame, a digging blade disposed below and extending longitudinally of the greater dimension of the frame, the ends of the blade being upturned, a straight brace and a curved link secured to each end of the blade and to the upturned portions, each straight brace being pivotally connected with an end of the frame, and guides on the ends of the frame receiving the ends of the curved links slidably and adjustably therethrough, whereby the blade is capable of adjustment into angles with respect to the ground.

2. A weed destroyer comprising a frame, brackets on the sides and ends of the frame, a transverse digger blade below the frame having upturned ends and a downturned rear edge, beams pivotally connected with certain of the brackets and rigidly connected with the intermediate portion of the blade, adjusting levers pivotally carried by the frame and pivotally connected with the beams, braces pivotally connected with the upturned ends of the blade and certain others of the brackets, and curved links slidably adjustable in the remaining brackets and pivotally connected with the upturned ends of the blade.

In testimony whereof, I affix my signature in the presence of two witnesses.

JAMES E. STEPHENS.

Witnesses:
 JERRY FRITCH,
 WILLIAM LEE.